United States Patent
Moulsley et al.

(10) Patent No.: US 7,171,229 B2
(45) Date of Patent: Jan. 30, 2007

(54) METHOD FOR OPERATING A RADIO COMMUNICATION SYSTEM

(75) Inventors: Timothy J. Moulsley, Caterham (GB); Matthew P. J. Baker, Canterbury (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 360 days.

(21) Appl. No.: 10/264,067

(22) Filed: Oct. 3, 2002

(65) Prior Publication Data

US 2003/0092461 A1 May 15, 2003

(30) Foreign Application Priority Data

Oct. 31, 2001 (GB) ................. 0126073.6
Nov. 5, 2001 (GB) ................. 0126423.3

(51) Int. Cl.
*H04B 7/00* (2006.01)
*H04Q 7/20* (2006.01)

(52) U.S. Cl. ............. 455/522; 455/69; 455/226.3

(58) Field of Classification Search ........... 455/522, 455/69, 226.3, 226.1, 436, 442, 450, 452.1, 455/452.2, 453, 67.11, 67.13, 500; 370/280, 370/332, 350, 252, 345
See application file for complete search history.

(56) References Cited

U.S. PATENT DOCUMENTS

| 4,782,489 | A | | 11/1988 | Moulsley ................ 371/30 |
|---|---|---|---|---|
| 5,233,349 | A | | 8/1993 | Moulsley ................ 341/107 |
| 6,167,031 | A | * | 12/2000 | Olofsson et al. ........... 370/252 |
| 6,351,499 | B1 | * | 2/2002 | Paulraj et al. ............. 375/267 |
| 6,603,797 | B1 | * | 8/2003 | Zeira et al. ................. 375/130 |
| 6,707,808 | B1 | * | 3/2004 | Vedrine ...................... 370/337 |
| 6,751,187 | B2 | * | 6/2004 | Walton et al. ............. 370/210 |
| 6,778,839 | B2 | * | 8/2004 | Valkealahti ................ 455/522 |
| 6,802,035 | B2 | * | 10/2004 | Catreux et al. ............ 714/746 |
| 6,810,236 | B2 | * | 10/2004 | Terry et al. ............. 455/67.11 |
| 2002/0115460 | A1 | * | 8/2002 | Rune et al. ................ 455/522 |
| 2002/0115464 | A1 | * | 8/2002 | Hwang et al. ............. 455/522 |
| 2003/0016641 | A1 | * | 1/2003 | Terry et al. ................ 370/335 |
| 2003/0148781 | A1 | * | 8/2003 | Sommer .................... 455/522 |

* cited by examiner

*Primary Examiner*—Edan Orgad

(57) ABSTRACT

In a radio communication system comprising a primary station (100) and a secondary station (110), the primary station is able to employ one of a plurality of transmission schemes for transmissions to the secondary station. The secondary station determines a quality parameter relating to a downlink channel (122) and from this parameter determines a measurement report to signal to the primary station. The measurement report indicates a suitable transmission power for one transmission scheme, and the primary station is able to determine from a plurality of power offsets between transmission schemes respective transmission powers for a plurality of transmission schemes. The power offsets may be signalled to the primary station by the secondary station. Such a scheme provides sufficient flexibility to handle a wide range of receiver capabilities without the need for excessive signalling.

12 Claims, 2 Drawing Sheets

METHOD FOR OPERATING A RADIO COMMUNICATION SYSTEM

The present invention relates to a radio communication system and further relates to primary and secondary stations for use in such a system and to a method of operating such a system. While the present specification describes a system with particular reference to the Universal Mobile Telecommunication System (UMTS), it is to be understood that such techniques are equally applicable to use in other mobile radio systems.

It is a common requirement in a radio communication system in which there is a bidirectional communication channel between a primary station and a secondary station for the secondary station to report to the primary station on the quality of a downlink channel from the first station to the second station. Such information enables the primary station to optimise transmissions on the downlink channel, for example by selecting a modulation scheme appropriate to the channel quality. However, the required signalling imposes some overhead, which it is desirable to minimise.

An example of a simple known scheme is where the secondary station measures one or more channel quality parameters and signals these directly back to the primary station. The quality parameters could for example include carrier to interference ratio (C/I), signal to noise ratio and delay spread. The primary station then selects suitable parameters for the downlink channel, for example the modulation scheme employed. However, a disadvantage of this approach is that receiver capabilities may vary considerably between different secondary stations, so that a secondary station having an advanced receiver could operate satisfactorily with a given modulation scheme in channel conditions where a less advanced receiver would have an unacceptable error rate.

One proposed UMTS embodiment, for the Frequency Division Duplex (FDD) mode, includes a scheme which addresses this problem by arranging for the secondary station to indicate a particular transmission scheme and transmission power which would enable a specified Block Error Rate (BLER) to be achieved for a downlink transmission. In UMTS a transmission scheme is defined by a Transport Format and Resource Combination (TFRC), which implies a particular modulation scheme, coding scheme and resource allocation, for example one or more channelisation codes. In order to minimise the signalling, a table of possible TFRC and power combinations is defined, which is intended to provide a continuous reporting range. However, such an arrangement is not flexible enough to cope with a variety of different receiver implementations.

An object of the present invention is to provide an improved signalling mechanism.

According to a first aspect of the present invention there is provided a radio communication system having a communication channel between a primary station and a secondary station, wherein the primary station comprises means for employing one of a plurality of transmission schemes for transmissions to the secondary station and wherein the secondary station comprises means for determining a quality parameter relating to a downlink communication channel and means responsive to the determined quality parameter for signalling a measurement report indicating a transmission power corresponding to one transmission scheme to the primary station, wherein the primary station comprises means for determining from the measurement report respective transmission powers for a plurality of transmission schemes in dependence on a plurality of power offsets between transmission schemes.

Such a system has sufficient flexibility to handle a wide range of receiver capabilities without the need for excessive signalling. In one embodiment the power offsets are signalled to the primary station by the secondary station. In another embodiment a predetermined measurement report is used to indicate that the channel quality is too low for any transmission.

In some embodiments of the present invention the primary station comprises a plurality of antennas. In one embodiment the secondary station determines a quality parameter relating to signals received from all the antennas. In another embodiment the secondary station determines separate quality parameters relating to each antenna and signals separate measurement reports relating to each antenna. In another embodiment the secondary station determines a quality parameter for the antenna from which the best signal is received and also signals the identity of this antenna.

According to a second aspect of the present invention there is provided a primary station for use in a radio communication system having a communication channel between the primary station and a secondary station, wherein means are provided for employing one of a plurality of transmission schemes for transmissions to the secondary station, for receiving a measurement report from the secondary station, said measurement report indicating a transmission power corresponding to one transmission scheme and for determining from the measurement report respective transmission powers for a plurality of transmission schemes in dependence on a plurality of power offsets between transmission schemes.

According to a third aspect of the present invention there is provided a secondary station for use in a radio communication system having a communication channel between a primary station and the secondary station, wherein means are provided for determining a quality parameter relating to a downlink communication channel, means responsive to the determined quality parameter are provided for signalling a measurement report indicating a transmission power corresponding to one transmission scheme to the primary station and means are provided for signalling a plurality of power offsets between transmission schemes to the primary station, thereby enabling the primary station to determine from the measurement report respective transmission powers for a plurality of transmission schemes.

According to a fourth aspect of the present invention there is provided a method of operating a radio communication system having a communication channel between a primary station and a secondary station, the method comprising the primary station employing one of a plurality of transmission schemes for transmissions to the secondary station and the secondary station determining a quality parameter relating to a downlink communication channel and in response to the determined quality parameter signalling a measurement report indicating a transmission power corresponding to one transmission scheme to the primary station, wherein the primary station determines from the measurement report respective transmission powers for a plurality of transmission schemes in dependence on a plurality of power offsets between transmission schemes.

Embodiments of the present invention will now be described, by way of example, with reference to the accompanying drawings, wherein.

Figure 1:
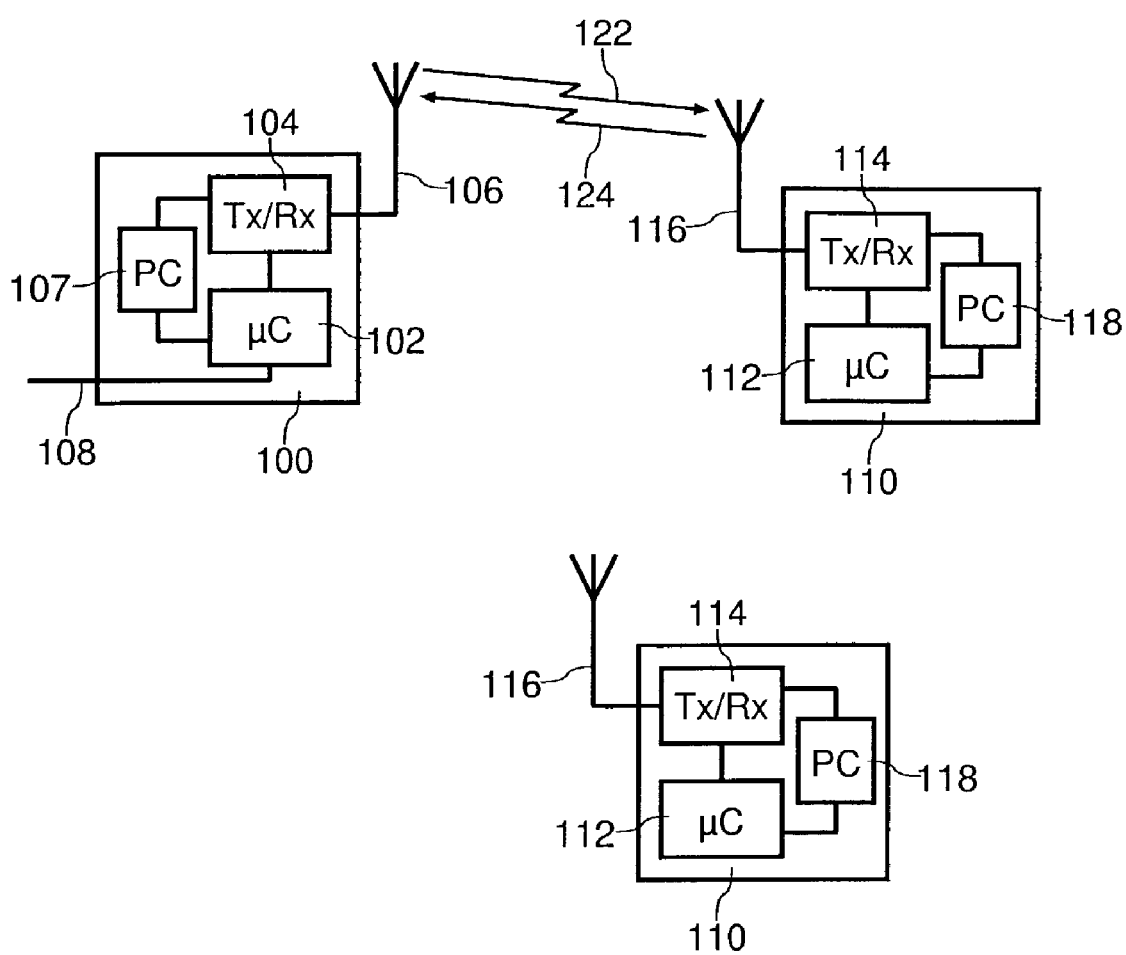
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

As discussed above, it is a common requirement for the MS 110 to report to the BS 100 on the quality of the downlink channel 122. For example, in a UMTS High Speed Downlink Packet Access (HSDPA) scheme the BS 100 determines a suitable transmission scheme (TFRC), comprising a combination of modulation scheme, code rate and number of channelisation codes, and a power level. This choice is made depending on a measurement of the quality of the downlink channel 122 signalled by the MS 110 to the BS 100.

In one proposed UMTS embodiment the MS 110 measures the Signal to Interference Ratio (SIR) of a pilot signal and uses a 5-bit reporting value V to indicate the channel quality to the BS 100, the value of V acting as an index to the following table indicating a recommended transmission scheme and power level:

| TFRC | P | V |
|---|---|---|
| TFRC1 | 12 dB | 0 |
| | 11 dB | 1 |
| | 10 dB | 2 |
| | 9 dB | 3 |
| | 8 dB | 4 |
| | 7 dB | 5 |
| | 6 dB | 6 |
| | 5 dB | 7 |
| | 4 dB | 8 |
| | 3 dB | 9 |
| | 2 dB | 10 |
| | 1 dB | 11 |
| | 0 dB | 12 |
| TFRC2 | 2 dB | 13 |
| | 1 dB | 14 |
| | 0 dB | 15 |
| TFRC3 | 2 dB | 16 |
| | 1 dB | 17 |
| | 0 dB | 18 |
| TFRC4 | 2 dB | 19 |
| | 1 dB | 20 |
| | 0 dB | 21 |
| TFRC5 | 2 dB | 22 |
| | 1 dB | 23 |
| | 0 dB | 24 |
| TFRC6 | 2 dB | 25 |
| | 1 dB | 26 |
| | 0 dB | 27 |
| — | — | 28 |
| — | — | 29 |
| — | — | 30 |
| — | — | 31 |

The signalled value V indicates the combination of TFRC and power offset P (relative to a predetermined reference) which would enable a particular BLock Error Rate (BLER) to be achieved if used for downlink transmissions. Values of V between 28 and 31 are not used at present. The power level may (as in this example) be defined relative to a particular reference power, which could for example be the power available for HSDPA downlink transmissions, or that power divided by the number of channelisation codes available. In the embodiment discussed, TFRC1 has the lowest bit rate and simplest modulation scheme while TFRC6 has the highest bit rate and most complex modulation scheme. Hence TFRC1 is the most robust and least efficient scheme, suitable for use in poor channel conditions, while TFRC6 is the least robust and most efficient scheme, suitable for use in good channel conditions. When the BS 100 receives the measurement report, it can determine the TFRC and transmission power for subsequent downlink transmissions with reference to the report.

Figure 2:
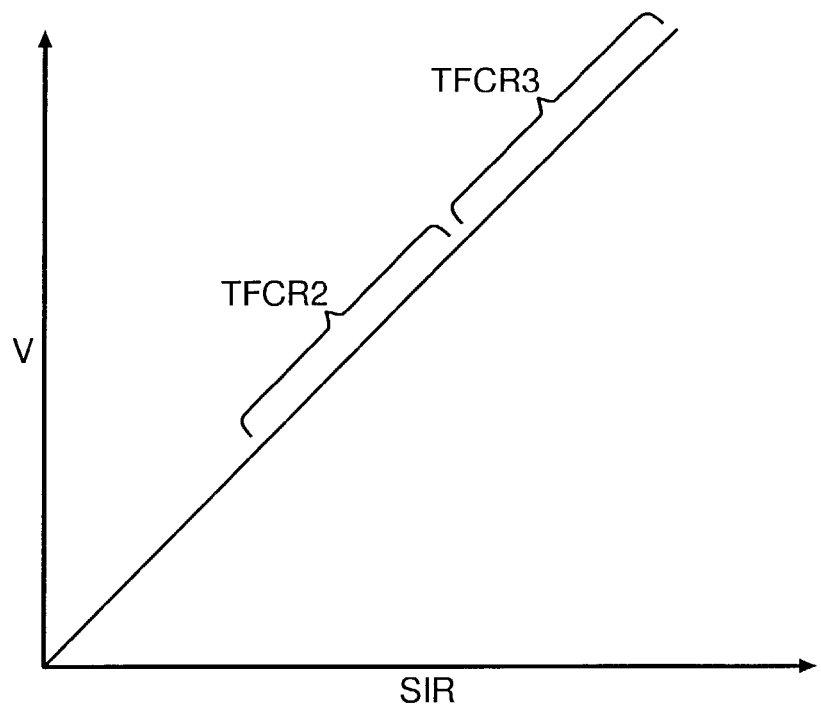
FIG. 2 is a graph of reporting value (V) against Signal to Interference Ratio (SIR) for a well-designed set of reporting values.

FIG. 2 is a graph of expected reporting value V against measured SIR for a MS 110. The reporting value increases linearly with the measured SIR, with regions corresponding to two particular TFRCs indicated. This approach has a number of advantages. Because the MS 110 determines the relationship between SIR, TFRC, P and BLER, the BS 100 does not need to know any details about the implementation of the MS 110, and the scheme is flexible enough to cater for mobile stations having more or less complex receiver implementations. For example, a MS 110 could use advanced receiver techniques such as interference cancellation, enabling a particular BLER to be achieved at a reduced SIR compared to a standard receiver implementation. By having a fixed table, such as that shown above, signalling requirements between MS 110 and BS 100 are minimised.

Figure 3:
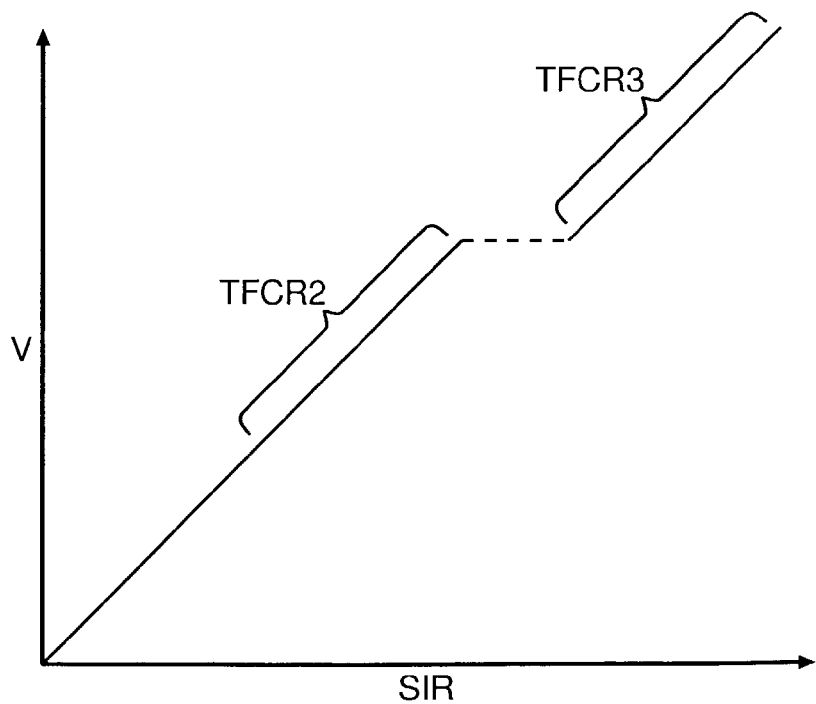
FIG. 3 is a graph of reporting value (V) against Signal to Interference Ratio (SIR) for a particular secondary station implementation.

However, a fixed table can cause problems if different MS implementations have different levels of performance, resulting in differences in the optimum mapping between channel quality, transmission scheme and power level. Changes in channel conditions, for example the characteristics of multipath interference, could also affect different implementations in different ways. FIG. 3 is a graph of reporting value V against measured SIR for a MS 110 having a different receiver implementation to that of the MS corresponding to FIG. 2. Here, the change in BLER between transmission schemes TFRC2 and TFRC3 is different to that in the assumed implementation, with the result that there are a range of SIR values (shown as a dashed line) for which no corresponding reporting value exists.

In a system made in accordance with the present invention, this problem is overcome by defining a measurement reporting table for just one TFRC, conveniently the most robust. Hence, the above table would be modified to:

| TFRC | P | V |
|---|---|---|
| TFRC1 | 12 dB | 0 |
| | 11 dB | 1 |
| | 10 dB | 2 |
| | 9 dB | 3 |
| | 8 dB | 4 |
| | 7 dB | 5 |
| | 6 dB | 6 |
| | 5 dB | 7 |
| | 4 dB | 8 |
| | 3 dB | 9 |
| | 2 dB | 10 |
| | 1 dB | 11 |

-continued

| TFRC | P | V |
|---|---|---|
| | 0 dB | 12 |
| | 2 dB | 13 |
| | 1 dB | 14 |
| | 0 dB | 15 |
| TFRC1 | −1 dB | 16 |
| | −2 dB | 17 |
| | −3 dB | 18 |
| | −4 dB | 19 |
| | −5 dB | 20 |
| | −6 dB | 21 |
| | −7 dB | 22 |
| | −8 dB | 23 |
| | −9 dB | 24 |
| | −10 dB | 25 |
| | −11 dB | 26 |
| | −12 dB | 27 |
| | — | 28 |
| | — | 29 |
| | — | 30 |
| | — | 31 |

This table indicates, as before, the power level (offset from a reference power) corresponding to a reporting value V. Similar tables are then generated, one for each TFRC, with each table having a different power offset between the power level in the table for the first scheme and the power level in the table for the scheme being considered. A default level of power offsets could be defined. If some or all of these offsets are not appropriate for a particular MS 110, that MS could signal a different set of power offsets (one per TFRC) to the network. Such signalling could be performed either as a setup operation, or performed as necessary during a call. The additional signalling requirements are relatively small compared with the extra flexibility introduced.

As an alternative to the use of tables, an equivalent formula can be employed, for example:

$$P(TFRC_n) = P_{ref} - V \times M_{step} + P_{off}(TFRC_n)$$

where:

$P(TFRC_n)$ is the power level needed to achieve the required BLER using the $n^{th}$ TFRC;

$P_{ref}$ is a reference power level;

V is the reporting value (for example a 5-bit integer as shown above);

$M_{step}$ is the power step between reporting values (for example 1 dB as used above); and $P_{off}(TFRC_n)$ is the power offset from the reference level needed to achieve the required BLER using the $n^{th}$ TFRC (which could conveniently be zero for $TFRC_1$).

A number of aspects of the above scheme could be adapted for particular embodiments. A predetermined reporting value V, for example zero, could be reserved to indicate that the channel quality is too low for any transmission. One or more of $P_{ref}$, $M_{step}$ and $P_{off}$ could be different for different reporting intervals between measurements, for example to enable a larger dynamic range of channel quality reports for low reporting rates. Also, $M_{step}$ need not be constant but could instead be a function of the reporting value V.

Advantageously, the reporting value V could be mapped to code words in a block code in such a way as to minimise the effect of channel errors, so that in the event of typical errors the decoded value of V is close to the one transmitted. The techniques disclosed in our U.S. Pat. No. 4,782,489 (Applicant's reference PHB33221) and U.S. Pat. No. 5,233, 349 (Applicant's reference PHB33693) could also be applied. As a related technique, the MSBs of the reporting value V could be preferentially protected against channel errors, for example by repetition, while it might not be necessary to code the LSBs similarly.

In a further embodiment of the present invention, the above schemes can be adapted for the case where the BS 100 has a plurality of antennas 106. In such an embodiment, there are a variety of ways in which a channel quality measure (such as the reporting value V above) can be derived and used.

In a first scheme, a single channel quality metric is derived by the MS 110 as a function of the combined SIR (for example) received from all the BS antennas 106. Such a scheme assumes that the BS 100 uses the same Modulation and Coding Scheme (MCS) and power level for transmissions from all antennas, as no information is available to the BS 100 about the relative contribution of the different antennas to the overall SIR as received by the MS 110. This scheme requires no additional signalling over a single-antenna scheme.

In a second scheme, the BS 100 transmits orthogonal pilot sequences from each of its antennas 106, enabling the MS 110 to estimate the SIR from each BS antenna separately. Hence, the amount of useful information about the channel which could be made available to the BS 100 is greatly increased. In one embodiment of this scheme, the MS 110 transmits one channel quality metric to the BS for each of the BS antennas 106. Clearly this embodiment requires significant uplink signalling, and is not easily scalable depending on the number of BS antennas 106. However, it allows very good adaptation at the BS 100, where the transmission parameters of each antenna 106 could be matched individually to the channel characteristics.

In an embodiment of such a scheme for UMTS HSDPA, two fields (20 bits in total) are available for signalling channel quality information, these fields being located immediately after a field provided for positive or negative acknowledgement of a received packet. There are a number of ways in which the transmissions required by this scheme could be accommodated into such an embodiment, for example:

Transmit quality metrics for each antenna 106 sequentially in all transmission fields available for such a purpose (possibly combining multiple metrics into a signle field). Hence, consecutive transmissions would allow a complete channel quality report to be built up, with information relating to each BS antenna in turn being transmitted successively. While avoiding the need for any extra uplink radio resources, this has the disadvantage that the quality information which was transmitted first may be out of date by the time it is used by the BS 100. Furthermore, downlink power control information cannot be used to correct fully the out-of-date quality information without separate signalling of power control commands for each BS antenna 106 (which is not currently done in UMTS).

Increase the power of the channel quality signalling fields to enable codewords with a smaller minimum distance to be used to signal more metrics at the same time. The power increase could be significant, for example with four antennas a 6 dB increase in transmission power for these fields would be required.

Additional channelisation codes could be used for the additional quality metric fields. However, this solution suffers from the same uplink power increase as the previous solution, as well as increasing the complexity of the MS 110.

Hence, in general, the transmission of multiple quality metrics may be unacceptably expensive in terms of the uplink signalling requirements. However, one way of mitigating the high uplink signalling requirements would be to signal a differential quality metric for each of the individual antennas, relative to some reference channel quality value. The reference channel quality value could be the average channel quality for all the antennas. This would also allow power control commands to be used to update the reference channel quality value, thus reducing the rate at which it would have to be updated.

In a third scheme, the MS 110 transmit a single channel quality metric to the BS 100, which metric relates to the best of the BS antennas 106 as seen by the MS 110. The BS antenna 106 to which the metric related could change from periodically, so it is also necessary to indicate to the BS 100 to which which antenna the metric relates. In one embodiment of this scheme, an "Antenna ID" is assigned by higher layers to each BS antenna 106 and signalled to the MS 110. This scheme typically requires less uplink signalling than the second scheme of transmitting multiple quality metrics.

The BS 100 could use this information in a number of ways. If it continued to use all its antennas 106 to transmit the data packet, the quality metric could still be used to select a MCS, as the channel quality for the best antenna would give the greatest contribution to the overall channel quality. The BS 100 could also choose to transmit only from the best antenna. This can have particular advantages in channels where the SIR from one antenna 106 is significantly greater than the SIR contributed by the next-best antenna. Using only the best antenna avoids wasting transmit power in antennas which have only poor paths to the MS 110.

This scheme requires more uplink signalling than the first scheme, but significantly less than the second scheme. This is because the only additional information which has to be signalled is the identity of the BS antenna 106 to which the quality metric refers. As a possible extension to this scheme, the MS 110 could also signal that the quality metric referred to all the BS antennas if the measured SIR of all (or at least the majority) of the antennas were sufficiently similar. The antenna identity could be signalled in a number of ways:

The signalling of the identity of the BS antenna 106 to which the quality metric refers is similar to the operation of Site Selection Diversity Transmission (SSDT) in the current version of the UMTS standard. SSDT is a mode in which a plurality of BSs 100 are in the active set of a MS 110, but only one of these BSs transmits user data to the MS (while all of the BSs transmit control information). One method for signalling antenna information is therefore to modify the higher-layer signalling to allow an SSDT identification to be assigned to the individual co-located antennas of a single BS 100.

Drawbacks of this solution include: a restricted ability to signal conventional SSDT cell IDs; the update rate would probably be too slow if medium or long SSDT IDs were used, while it would be difficult to use short SSDT ID codes if conventional SSDT were to be permitted at the same time as signalling the ID of the antenna to which a quality metric relates; and the signalling of the antenna ID would be separated from the other control traffic relating to HSDPA.

In order to accommodate antenna ID signalling together with other uplink HSDPA signalling, it could be coded into either the acknowledgement field or the channel quality fields, to avoid the addition of extra uplink fields. By combining the antenna ID together with the quality metric, a single code word could be generated for transmission in the channel quality field. Such signalling could be accommodated in a backwards-compatible manner by inserting additional code words between code words which would otherwise be used for signalling a single channel quality metric. Use of the already-defined code word for each channel quality level would then be assumed to mean that the quality information related to all the BS antennas together, hence retaining backwards compatibility.

It is likely that not all the available channel quality fields will be used for the transmission of quality metrics. Hence, any remaining unused fields could be used for signalling the antenna ID. However, transmission of an antenna ID would be unlikely to need the whole of a channel quality field, and this method could require modification of the timing of the signalling of the channel quality information itself.

The power level at which the channel quality metric is transmitted may be adjusted in order to achieve a required level of reliability. This power level could be controlled by a message sent from the BS 100 to the MS 110. This could specify the power level relative to the pilot bits on the uplink dedicated control channel, or relative to the current power level for the channel quality metric. In the case of the dedicated control channels of one MS 110 being in soft handover with more than one BS 100 the power of the uplink dedicated control channel is not likely to be optimal for all the BSs 100 involved. Therefore, a different power level, preferably higher, may be used for sending the channel quality metric. This power difference could be fixed, or determined by a message from a BS 100. When the transmission of the channel quality metric is directed to a particular BS 100, the power level may be further modified to take into account the quality of the radio channel for that transmission. For example, if the best radio link from the active set is being used, the power level may be lower than otherwise.

Although discussed above in the context of the present invention, the antenna signalling embodiment is not limited to use with the signalling scheme of the present invention and can be applied to a range of other schemes for signalling channel quality information.

As well as its application in a FDD system as described above, the present invention could be applied in other types of communication system. For example, it could be used in a Time Division Duplex (TDD) system. Although the fact that the uplink and downlink channel use different time slots at the same carrier frequency could reduce the need for signalling of channel information, the flexibility of allowing for different MS implementations remains a useful feature.

The embodiments described above relate to packet transmission. However, the same principles can equally well be applied to a system in which circuits are set up for data transmission (e.g. for speech).

The description above related to the BS 100 performing a variety of roles relating to the present invention. In practice these tasks may be the responsibility of a variety of parts of the fixed infrastructure, for example in a "Node B", which is the part of the fixed infrastructure directly interfacing with a MS 110, or at a higher level in the Radio Network Controller (RNC). In this specification, the use of the term "base station" or "primary station" is therefore to be understood to include the parts of the network fixed infrastructure involved in an embodiment of the present invention.

From reading the present disclosure, other modifications will be apparent to persons skilled in the art. Such modifications may involve other features which are already known in the design, manufacture and use of radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A radio communication system having a communication channel between a primary station employing one of a plurality of transmission schemes for communicating with a secondary station,
   wherein the secondary station comprises
   means for determining a quality parameter relating to a downlink communication channel,
   means responsive to the determined quality parameter for signaling to the primary station a measurement report indicating a transmission power corresponding to a single one of the plurality of transmission schemes for achieving a desired signal quality, and wherein the primary station comprises:
   means for determining from the measurement report respective transmission powers for the plurality of transmission schemes in dependence on a plurality of power offsets among the transmission schemes and wherein a differential quality parameter is signaled for each antenna or a single quality parameter is signaled corresponding to an antenna with the highest channel quality.

2. A system as claimed in claim 1, wherein the secondary station further comprises:
   means for signaling the plurality of power offsets to the primary station.

3. A system as claimed in claim 1, wherein the transmission power is indicated relative to a reference power level.

4. A primary station for use in a radio communication system having a communication channel between the primary station and a secondary station, wherein means are provided for:
   employing one of a plurality of transmission schemes for transmissions to the secondary station,
   receiving a measurement report from the secondary station, said measurement report indicating a transmission power corresponding to a single one of the plurality of transmission schemes for achieving a desired signal quality and
   determining from the measurement report respective transmission powers for a plurality of transmission schemes in dependence on a plurality of power offsets among the transmission schemes, and
   means to signal a differential quality parameter for each antenna or a single quality parameter corresponding to an antenna with the highest channel quality.

5. A secondary station for use in a radio communication system having a communication channel between a primary station and the secondary station, wherein
   means for determining a quality parameter relating to a downlink communication channel,
   means responsive to the determined quality parameter for signaling a measurement report indicating a transmission power corresponding to a single one of the plurality of transmission schemes for achieving a desired signal quality to the primary station,
   means for signaling a plurality of power offsets among the transmission schemes to the primary station, and
   means to signal a differential quality parameter for each antenna or a single quality parameter corresponding to an antenna with the highest channel quality thereby enabling the primary station to determine from the measurement report respective transmission powers for a plurality of transmission schemes.

6. A secondary station as claimed in claim 5, further comprising:
   means for encoding the measurement report so that the effect of channel errors is minimised.

7. A secondary station as claimed in claim 6, further comprising:
   means for preferentially protecting at least one of most significant bits of the measurement report compared to at least one of least significant bits.

8. A secondary station as claimed in claim 5, wherein the primary station comprises:
   a plurality of antennas and
   means for determining a quality parameter relating to each of the antennas and for signaling a measurement report corresponding to that quality parameter to the primary station.

9. A secondary station as claimed in claim 5, wherein the primary station comprises;
   a plurality of antennas and
   means for determining the n antennas providing the best quality parameters, where n is at least one, for signaling n measurement reports, each corresponding to a respective quality parameter, and for signaling the identity of the n antennas.

10. A method of operating a radio communication system having a communication channel between a primary station employing one of a plurality of transmission schemes for transmissions to a secondary station the method comprising the steps of:
    determining a quality parameter relating to a downlink communication channel; and
    responsive to the determined quality parameter signaling a measurement report indicating a transmission power corresponding to one of the plurality of transmission schemes for achieving a desired signal quality to the primary station, wherein the primary station determines from the measurement report respective transmission powers for a plurality of transmission schemes in dependence on a plurality of power offsets among the transmission schemes and wherein a differential quality parameter is signaled for each antenna or a single quality parameter is signaled corresponding to an antenna with the highest channel quality.

11. A method as claimed in claim 10, wherein using a predetermined measurement report to indicate that the channel quality is too low for any transmission.

12. A method as claimed in claim 10, wherein the transmission power being signaled relative to a reference value.

* * * * *